Patented May 2, 1939

2,156,956

UNITED STATES PATENT OFFICE 2,156,956

SYNTHETIC RUBBERLIKE COMPOSITIONS

Maynard C. Agens, Schenectady, N. Y., assignor to General Electric Company, a corporation of New York No Drawing. Application April 30, 1937,
Serial No. 139,944

5 Claims. (Cl. 260—36)

This invention relates to synthetic rubber-like compositions and method of making the same. It is more particularly directed to the preparation of such compositions of the class comprising polyvinyl halides and specifically polyvinyl chloride.

Synthetic rubber-like compositions may be made from polyvinyl halides, such as polyvinyl chloride, by plasticizing the latter with a material which is substantially non-volatile at elevated temperature and allowing the mass to cool to a stiff rubbery gel. The most common plasticizer employed is tricresyl phosphate.

Although polyvinyl chloride plasticized with tricresyl phosphate produces satisfactory products for most purposes, films produced therefrom discolor at elevated temperatures and lose their flexibility. Moreover, at elevated temperatures such films show little or no strength.

I have discovered that esters of ricinoleic acid act as plasticizers for polyvinyl halides, such as, for example, polyvinyl chloride, and impart to such compositions a marked stabilizing effect at elevated temperatures. Films prepared from such compositions are clear, practically colorless, flexible and of considerable strength. Castor oil (the glycerol ester of ricinoleic acid) exerts a plasticizing effect on the polyvinyl halide but is not completely miscible with the latter and yields a film which is cloudy.

In place of the esters of ricinoleic acid the esters of the polymerized acid, such as the ethyl and butyl esters of polymerized ricinoleic acid, and also the acetylated esters of ricinoleic acid may be used. Although castor oil is not completely miscible with the polyvinyl halide and yields a cloudy film, the glycerol ester of acetylated ricinoleic acid is retained by the polyvinyl halide and yields a clear, colorless, flexible film. I have also found that the esters of acetylated polymerized ricinoleic acid may be used as plasticizers for the polyvinyl halide.

In carrying the invention into practice it is first preferred to dissolve or swell the mixture of the ester of ricinoleic acid and the polyvinyl halide in a solvent or swelling agent therefor and then either heat the mass sufficiently to obtain an intimate mixture of the solvent or swelling agent with the ester of ricinoleic acid and the polyvinyl halide, or employ a combination of heat and pressure.

A specific example of the preparation of a film in accordance with my invention is the following:

| | Parts by weight |
|---|---|
| Polyvinyl chloride | 60 |
| Methyl ricinoleate | 40 | were dissolved in fenchone to form a 10% solution. Films were prepared from this solution, by baking at 140° C. for about one-half hour. The films produced were clear and flexible. In place of methyl ricinoleate, ethyl ricinoleate and butyl ricinoleate were used. Clear, flexible films resulted.

An example of the present invention utilizing the esters of acetylated ricinoleic acid is as follows:

| | Parts by weight |
|---|---|
| Polyvinyl chloride | 60 |
| Acetylated castor oil | 40 | were swelled in methyl amyl ketone, sheeted on hot mixing rolls and then pressed between chromium plated metal plates at about 150° C. The result was a transparent, flexible, tough and strong sheet.

Instead of using heat and pressure as in the example cited, direct solution at elevated temperature may be employed. Using this procedure and employing various amounts of acetylated castor oil with polyvinyl chloride, films were prepared by dipping a glass plate into a solution comprising polyvinyl chloride, acetylated castor oil and a ketone such as methyl amyl ketone or fenchone.

Films from a fenchone solution obtained as described, were baked at 170° C. for one-half hour and then stripped from the glass. The products were clear, practically colorless, flexible films of considerable strength.

In place of acetylated castor oil, other esters of acetylated ricinoleic acid may be used, for example the butyl and ethyl esters. These compounds also give clear, flexible films.

Moreover it is possible to use the esters of acetylated polymerized ricinoleic acid, such as the methyl and butyl esters of acetylated polymerized ricinoleic acid.

Some interesting properties of films plasticized with acetylated castor oil have been observed. In one case, a film made from 60 parts of polyvinyl chloride and 40 parts of acetylated castor oil, left in a 145° C. oven overnight, was found to have darkened somewhat but still retained considerable flexibility. Similar films brought up to 100° C. retain their film strength whereas a film from a corresponding composition using tricresyl phosphate as plasticizer has little film strength at 100° C. It will thus be seen that the acetylated castor oil probably exerts a stabilizing effect on the polyvinyl halide at elevated temperatures, making it possible to heat solutions of the composition to higher temperatures with less discoloration.

It will be apparent that the invention is not limited to the specific examples given nor to the proportions of ingredients employed therein. While methyl amyl ketone and fenchone have been specifically named, other solvents may be used as will be apparent to those skilled in the art.

What I claim as new and desire to secure by Letters Patent of the United States is:

1. A composition comprising a polyvinyl halide and an ester of acetylated ricinoleic acid.
2. A composition comprising a polyvinyl halide and an ester of acetylated polymerized ricinoleic acid.
3. Polyvinyl chloride plasticized with acetylated castor oil.
4. A strong, flexible, substantially colorless film of polyvinyl chloride plasticized with an acetylated ester of ricinoleic acid.
5. A heat- and light-stable plasticized gamma polyvinyl chloride composition containing butyl acetyl-ricinoleate.

MAYNARD C. AGENS.